United States Patent [19]

Oliver

[11] Patent Number: 5,907,490

[45] Date of Patent: May 25, 1999

[54] SYSTEM AND METHOD FOR PROJECT MANAGEMENT AND ASSESSMENT

[75] Inventor: Michael E. Oliver, Etters, Pa.

[73] Assignee: Electronic Data Systems Corporation, Plano, Tex.

[21] Appl. No.: 08/872,248

[22] Filed: Jun. 10, 1997

[51] Int. Cl.[6] .............................. G06F 19/00; G06G 7/64; G06G 7/66

[52] U.S. Cl. ................................ 364/468.05; 364/468.06; 364/468.15; 364/551.01; 364/551.02; 705/3; 705/8

[58] Field of Search ............................... 364/578, 468.01, 364/468.02, 468.03, 468.05, 468.06, 468.08, 468.1, 468.15, 468.16, 468.18, 468.22, 468.24, 188, 551.01, 551.02; 395/650, 22, 24, 21, 20, 700, 140; 705/8, 9, 3; 345/134, 135, 136, 137, 140

[56] References Cited

U.S. PATENT DOCUMENTS

| | | | |
|---|---|---|---|
| 5,101,340 | 3/1992 | Nonaka et al. | 395/650 |
| 5,172,313 | 12/1992 | Schumacher | 364/401 |
| 5,197,001 | 3/1993 | Mukherjee | 364/403 |
| 5,291,397 | 3/1994 | Powell | 364/402 |
| 5,303,170 | 4/1994 | Valko | 364/578 |
| 5,381,332 | 1/1995 | Wood | 364/401 |
| 5,406,476 | 4/1995 | Deziel, Jr. et al. | 364/402 |
| 5,442,730 | 8/1995 | Bigus | 395/22 |
| 5,537,524 | 7/1996 | Aprile | 395/140 |
| 5,548,506 | 8/1996 | Srinivasan | 364/401 |
| 5,765,139 | 6/1998 | Bondy | 705/8 |

OTHER PUBLICATIONS

*Special Edition Using Microsoft Project for Windows 95*, front page, table of contents, pp. 503,579,701 and index page,© 1996.

*Primary Examiner*—William Grant
*Assistant Examiner*—Ramesh Patel
*Attorney, Agent, or Firm*—L. Joy Griebenow; Baker & Botts, L.L.P.

[57] ABSTRACT

A system (100) for monitoring and assessing the performance of a project includes a computer (120) and a software program associated with the computer (120), with the software program and computer (120) operable in combination to receive project task data from a project management software file, determine current earned value (EV) information from the project task data, and graphically displaying the earned value information. A method for monitoring and assessing the performance of a project may be accomplished by entering task data for each task of the project in a project management software file; obtaining (158) the task data from the project management software file; calculating (160) a current earned value position; obtaining (182) historical earned value positions if any exists; and displaying (162, 184) the current earned value position and any historical earned value positions.

20 Claims, 3 Drawing Sheets

SYSTEM AND METHOD FOR PROJECT MANAGEMENT AND ASSESSMENT

TECHNICAL FIELD OF THE INVENTION

The invention relates to project management systems and methods, and more particularly to a software-based system and method for project management and assessment.

BACKGROUND OF THE INVENTION

Good project management is an important factor to the success of a project. A project may be thought of as a collection of activities and tasks designed to achieve a specific goal of the organization, with specific performance or quality requirements while meeting any subject time and cost constraints. Project management refers to managing the activities that lead to the successful completion of a project. Project management focuses on finite deadlines and objectives. A number of tools may be used to assist with project management and assessment.

A fundamental scheduling technique used in project management is the Critical Path Method (CPM). With this model, the tasks that must be completed are determined and task data developed for each. The task data may include the start date, time required, sequencing requirements, finish date, cost effort, and resources. When all the tasks are determined, the path of tasks on the longest sequence for completion of the project becomes what is known as the "critical path" and the tasks on it "critical tasks." The sequencing of tasks in the project may be graphically presented in what is known as a PERT chart. The tasks and their duration may also be presented with a bar chart known as a Gantt chart.

A typical large project may be thought of as having four phases: (a) start up, (b) planning, (c) execution, and (d) close-down. During the planning phase, the numerous tasks that make up the project are determined and task data for each are determined. A baseline may be established when all of the project stakeholders concur on the appropriate plan. The baseline is the approved project plan (amount and timing) for a work assignment, output, set of outputs, or overall project. As used here, cost is an all-inclusive term that includes either dollars or effort hours. The baseline represents cost and effort expenditures with respect to time and activities. The resources necessary to complete project activities provide the basis for determining the cost and effort requirements. This determination is initially performed in the project planning stage and revisited whenever baseline revisions are deemed necessary.

The baseline is referenced throughout the project with the actual data. The actual data refers to the start and finish dates for tasks and actual costs, e.g., actual effort hours, applied or spent on a work assignment, output, set of outputs, or the overall project. At periodic time intervals during the project, the actuals and baseline are compared to determine a variance from the plan and also to forecast anticipated completion dates and costs for all remaining work. The forecast is the predicted cost, e.g., effort hours, to be spent to complete the remainder of a work assignment, output, set of outputs, or the overall project.

One of the more commonly used software packages for project schedule management is Microsoft® Project, which comes in numerous versions such as Microsoft® Project for Windows® 95. Microsoft® Project allows for task data such as duration, start date, finish date, and resources to be entered. As the project advances information on actual performance may be entered and information developed and presented concerning the performance of the project to date. See generally, Tim Pyron and Kathryne Valentine, *Using Microsoft® Project for Windows®* 95 (special ed. 1996). Microsoft Project® and other software systems for project management (collectively "project management software") do not, however, provide sufficient or readily-accessible earned value (EV) analysis information.

In managing a project, earned value (EV) analysis is applied to provide a more objective measurement of a project's cost and schedule performance than other project management methods. EV information facilitates analysis of the project's cost and schedule. For example, by comparing earned value with a baseline, the value of the work accomplished is compared to the value of the work planned. By comparing earned value and actuals, the value of work accomplished is compared to the value of the costs actually spent.

SUMMARY OF THE INVENTION

Therefore, a need exists for a software-based system and method for project management and assessment that provides detailed earned value information and related analysis information. In accordance with an aspect of the present invention, a system is provided for monitoring and assessing the performance of a project that includes a computer and a software program associated with the computer, with the software program and computer operable in combination to receive project task data from a project management software, determine current earned value (EV) information from the project task data, and graphically displaying the earned value information.

According to another aspect of the present invention, a method is provided for manufacturing a system for monitoring and assessing the performance of a project that involves providing a computer with a processor and memory, and programming the processor and memory to obtain project task data obtained in project management software, calculate a current earned value position based on the task data, prepare historical earned value positions for each reporting time increment if more than one reporting time increment has passed, and display the present earned value position and any historical earned value positions.

According to another aspect of the present invention, a method is provided for monitoring and assessing the performance of a project by entering task data for each task of the project in a project management software, obtaining the task data from the project management software, calculating a current earned value position, obtaining historical earned value positions if any exists, and displaying the current earned value position and any historical earned value positions.

A technical advantage of the present invention is that it automatically calculates detailed and makes display readily-accessible earned value information. Another advantage of the present invention is that it simplifies comparison of accomplished results to planned results. Another technical advantage of the present invention is that it facilitates the quantification of costs and schedule impacts throughout the project. Yet another technical advantage of the present invention is that it assists in identifying and resolving problems not recognized by other project management tools.

BRIEF DESCRIPTION OF THE DRAWINGS

For a more complete understanding of the present invention and advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in FIGS. 1–7 of the drawings, like numerals being used for like and corresponding parts of the various drawings.

EV helps to measure objectively what has been accomplished on a project. Note that the earned value is determined by using the baseline effort, schedule status, and an earned value measurement rule, and is independent of actual effort spent. Objective criteria are preferably used to determine the number of completed tasks and, in some instances, may also include credit for started but not yet completed tasks. For example, the following relatively conservative criteria or earned value measurement rules (Table 1) may be used.

TABLE 1

EARNED VALUE MEASUREMENT RULES

| Technique | Description | Some Advantages | Some Disadvantages |
| --- | --- | --- | --- |
| 0 or 100% Rule | A task that is completed is given 100% credit and one that is not complete is given 0% credit even if its 99% complete at the time of analysis. | The 0–100% rule is simple and objective. The rule promotes completion of tasks. | This rule may underreport accomplishment at intermediate reporting points. It may require more planning detail. |
| 50—50 Rule | A task is considered 50% complete upon initiation of the task, and the final 50% is credited upon completion. | The 50—50 rule is simple and objective. It allows some credit for work started, but not completed. It encourages completion of tasks. | This rule may cause over reporting of tasks that are started but have experienced little work. This rule may require more detail and work in tracking. |
| Milestone Rule | A task is given increasing | The milestone approach is | The milestone approach is |

TABLE 1-continued

EARNED VALUE MEASUREMENT RULES

| Technique | Description | Some Advantages | Some Disadvantages |
| --- | --- | --- | --- |
| | partial credit as interim milestones within the task are completed. | fairly objective and allows for more incremental credit as a task proceeds toward completion. | relatively complex compared to other rules and requires more time to track. |

In some instances, a fourth rule, which is less conservative, is used. The fourth approach or rule is to estimate the percent completion for each task that is underway. This approach is more subjective and consequently, optimistic project managers may overstate the percentage of completion. The four rules given above are illustrative; other rules of a similar nature may be used.

Figure 1:
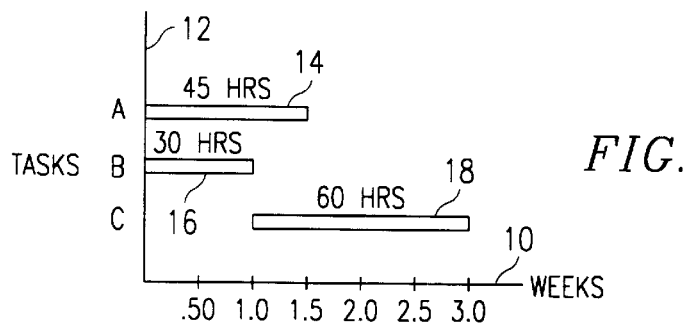
FIG. 1 is a Gantt chart for an exemplary project with which the present invention may be utilized.

EV information describes what has been accomplished as the project progresses. Without it, the actuals and baseline do not adequately indicate problems or point out the need for additional attention. A simple example will illustrate the need for EV information. Referring to FIG. 1, a Gantt chart for an exemplary project with which the present invention may be utilized is shown. The project includes three tasks. The ordinate axis 12 lists the three tasks: Task A, Task B, and Task C. The abscissa axis 10 reflects reporting time increments in weeks. For simplicity, the chart has been prepared with the understanding that each task will be worked on by a single person and that the person will devote thirty hours per week to the project. Only Tasks B and C requiring sequencing with Task B preceding Task C as shown. Thus, as reflected by graph line 14, Task A will take 45 effort hours and consume 1.5 weeks. As shown by graph line 16, Task B will take 30 effort hours and consume one week, and Task C as shown by graph line 18 will start at the completion of Task B, take 60 effort hours, and be completed at the end of week three. The scheduling shown in the Gantt chart of FIG. 1 is done in the planning process, and as scheduled, constitutes the baseline for the project. The baseline reflects the anticipated expenditure of resources, such as effort hours for each task and the timing of such expenditure. The distinctions between EV, baseline, and actuals will be further described in connection with FIG. 2.

In using EV, sufficient detail must be included in breaking the project into tasks. Earned value is based on subdividing the work into short-duration tasks. One rule of thumb used sometimes is that no project detail task should be greater than two weeks; otherwise, the earned value analysis may not be sufficiently meaningful for project management and assessment.

Figure 2:
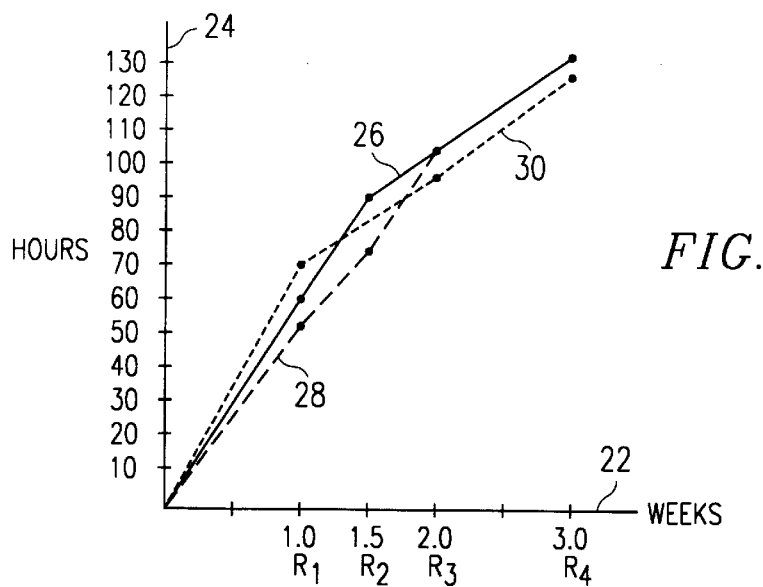
FIG. 2 is an exemplary graphical display of project data and earned value information for a project according to the present invention.

Referring now to FIG. 2, an exemplary graphical display of project data and EV information for a project according to the present invention is shown. The baseline pattern for the delivery of effort hours is shown in the graph along with the EV and actuals based on exemplary information from FIG. 1. The graph has on its abscissa axis 22 the reporting time increments in weeks and four specific reporting points, $R_1$, $R_2$, $R_3$, and $R_4$, which are to be discussed. The ordinate axis 24 shows the cumulative effort hours for the project. The baseline has been graphically illustrated by line 26. The EV valves are shown graphically by line 28, which has been calculated by the 50—50 rule, and the actual effort hours expended are shown by line 30.

Considering the results at reporting point one, $R_1$, the baseline calls for 60 effort hours to have been expended, but 70 hours have actually been spent. At reporting point one, Task B is complete and Task A has been started, and thus under the 50% rule, 52.5 effort hours are considered earned. While it may not be initially apparent without the EV information due to the simplicity of this exemplary three task project, the project is over budget; this is easily seen, however, by comparing the actuals with the EV positions. The project is also behind schedule because the EV position is beneath the baseline. Thus, without EV information, a project manager might believe that the project, while slightly over budget, is at least on time.

If an analysis is conducted at reporting point two, $R_2$, the information seems to indicate that the project is under budget because actuals are less than baseline, but still behind schedule because the earned value position is still lagging from baseline. Note, however, that the project is over budget from an EV perspective because actuals are greater than the earned value. At reporting point three, $R_3$, the project is on schedule as indicated by the coincidence of the EV position and the baseline, and the project is under budget as reflected by actuals being lower than the EV position. Finally, at reporting point four, $R_4$, the project has been completed on schedule and under budget. This simple example shows the importance of objectively tracking completion of tasks during project management, i.e. EV analysis. While not always needed, an EV analysis can prove to be very important because trends that develop with respect to EV during completion of a project can identify potential longer-term problems related to performance factors or areas of concern for an overall project and thereby help with their resolution earlier in the project.

The EV of a project may be used and analyzed in a number of additional ways to assess a project. Examples of calculations that may be made from EV and related information to provide EV-related information follow:

TABLE 2

EV INFORMATION AND EV-RELATED INFORMATION

| | ITEM | EQUATION |
|---|---|---|
| (1) | Cost Variance (CV): | CV = earned value − actual |
| (2) | Variance At Completion (VAC): | VAC = total baseline − forecast |
| (3) | Cost Variance Percent (CV %): | CV % = [cost variance/EV] * 100 |
| (4) | Cost Performance Index (CPI): | CPI = EV/actual |
| (5) | Percent Complete (PC): | PC = EV/total baseline * 100 |
| (6) | Percent Spent (PS) | PS = actual/forecast * 100 |
| (7) | To-Complete-Performance Index [Forecast] ($TCPI_f$) | $TCPI_f$ = (total baseline − EV)/(forecast − actual) |
| (8) | To-Complete-Performance Index [baseline] ($TCPI_b$) | $TCPI_b$ = (total baseline − EV)/(total baseline − actual) |
| (9) | Improvement Ratio [forecast] ($IR_f$) | $IR_f$ = [($TCPI_f$/CPI) − 1] * 100 |
| (10) | Improvement Ratio [baseline] ($IR_b$) | $IR_b$ = [($TCPI_b$/CPI) − 1] * 100 |
| (11) | Independent Forecast (IF) | IF = actual + [(total baseline − EV)/CPI] |
| (12) | Schedule Variance (SV) | SV = EV − baseline |
| (13) | Schedule Variance | SV % = (SV/baseline) * 100 |

TABLE 2-continued

EV INFORMATION AND EV-RELATED INFORMATION

| | ITEM | EQUATION |
|---|---|---|
| (14) | percent (SV %) Schedule Performance Index (SPI) | SPI = EV/baseline |
| (15) | Schedule variance in months (SVm) | SVm = SV/(EV/months to date) |

While table 2 presents the predominant EV-related information that may be useful or desired, but other EV calculations may be performed to yield EV-related information.

Figure 3:
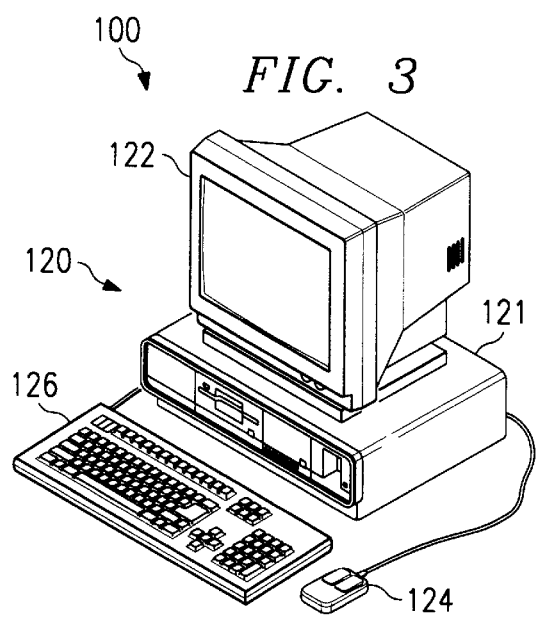
FIG. 3 is a perspective view of an exemplary system in accordance with the present invention.

Referring to FIG. 3, a perspective view of an exemplary system in accordance with the present invention is shown. Exemplary system 110 for project management and assessment includes a microprocessor-based computer 120. Computer 120 preferably has an Intel 80×86 microprocessor such as an 80486 or Pentium that may be housed in a main computer portion 121. Computer 120 is preferably capable of running Microsoft Windows® Version 3.1 or higher and Microsoft® Project (MP) or other project management software. Computer 120 will typically include components such as an internal hard drive or other suitable program memory, and/or one or more disc drives for uploading programs and data. Computer 120 may also include other devices such as a CD ROM drives, optical drives and/or other devices. Computer 120 includes a sufficient amount of memory to support its operating system as well as all applications and utility software desired to run on computer 120.

Computer 120 includes a display screen 122 which may have a graphical user interface (GUI). Computer 120 may receive input from a touch screen; a pointing device 124, which may be any of a number of devices such as a mouse, a touch pad, a roller ball, or other devices; and may also receive input through keyboard 126. Computer 120 is further programmable and operable to perform EV analysis according to the system and methods of the present invention. The programming of computer 120 to carry out the steps discussed herein, may be accomplished with any number of computers and any number of programming languages or applications, but in a preferred embodiment, is programmed using Microsoft®'s VISUAL BASIC.

Figure 4:
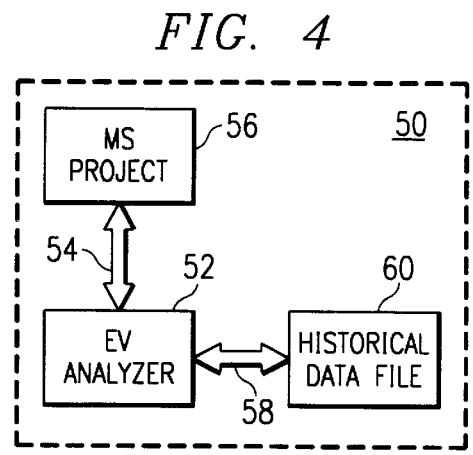
FIG. 4 is a block diagram of an exemplary architecture of the system of FIG. 3.
Figure 5:
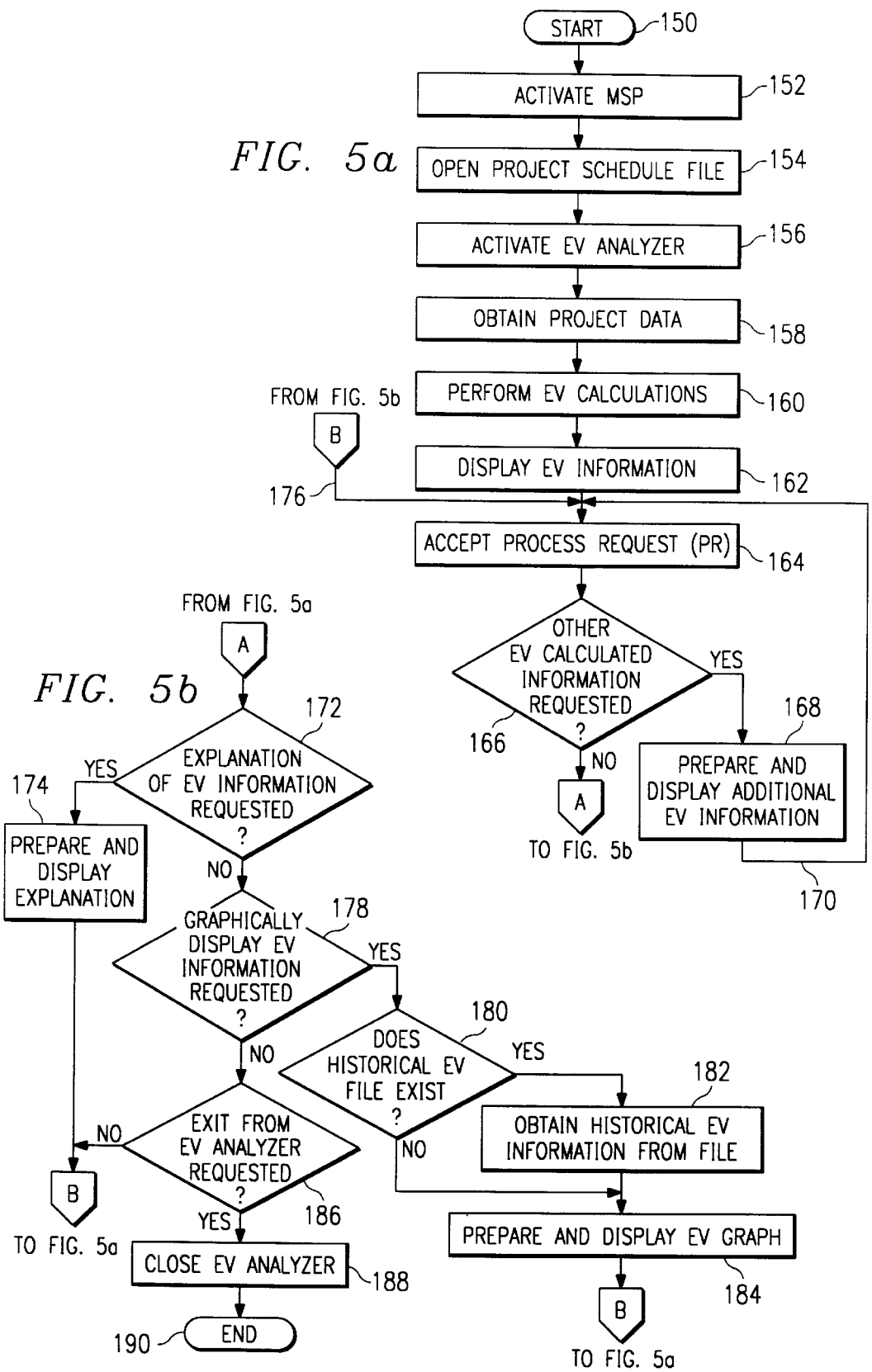
FIGS. 5a and 5b are flowcharts illustrating one exemplary process flow for a method according to the present invention.

Referring now to FIG. 4, a block diagram of an exemplary architecture 50 within the system of FIG. 3 is shown. As an important aspect of the present invention, a software module or programming segment 52 is used to calculate and display EV information and EV-related information. Module or segment 52 will be referred to as an "EV analyzer" 52. An object link 54 is established between the EV analyzer 52 and the project management software 56; which software 56, by way of example, is shown as Microsoft Project®, with its data file 56. Object link 54, which may be an object link (OLE2) in Microsoft® VISUAL BASIC, allows information such as task data, to be delivered upon request to EV analyzer 52. EV analyzer 52 may also receive information by a data link 58 from a historical data file 60. File 60 may be a floppy disk or hard disk or other storage medium accessible to EV analyzer 52 on computer 120.

Referring now to FIGS. 5a and 5b, a flowchart illustrating one exemplary process flow for a method according to the present invention is shown. The basic events are presented and then described in more detail further below. The process is accomplished with architecture 50 (FIG. 4) described above as part of system 100 (FIG. 3). After starting at block 150, the first step is for the project management software, to be activated as shown in block 152. Then, the specific project schedule file or data file is opened as shown at block 154. The EV analyzer program segment is then initiated as reflected at block 156. Once initiated, the EV analyzer obtains the project data or task data from the project management software as shown at block 158. Current EV information is then calculated by the computer at block 160 and displayed at block 162.

An operator interfacing with the computer may then enter a number of different process requests as reflected at block 164. While the specific process flow may be arranged in parallel with different paths being defined by the operator, for convenience in FIGS. 5*a* and 5*b* they are presented as a sequential process flow which first begins by determining whether EV-related information has been requested (interrogatory block 166). If additional information has been requested, the additional information is calculated or retrieved and displayed at block 168. The process then returns along path 170 to block 164 where additional process requests may be entered.

If the answer to interrogatory block 166 is in the negative, the process continues to interrogatory block 172 to determine whether EV-explanatory information has been requested. EV-explanatory information helps explain the information to the operator. If EV-explanatory information has been requested, it is prepared and displayed as reflected by block 174. The process then continues along path 176 back to block 164. If the answer to interrogatory block 172 is in the negative, the process continues to interrogatory block 178, which determines whether the operator desires EV information to be graphically displayed. If so, at interrogatory block 180, the operator may be asked or the computer may determine on its own whether a historical EV file exists. If such a file does exist, the process proceeds to block 182 where the historical EV information file is accessed to obtain historical EV data. At block 184, the current EV information and historical EV information are prepared and graphically displayed on the computer monitor. If interrogatory block 180 is negative, the process proceeds directly to block 184. Once the activities of block 184 are completed, the process returns to block 164 where additional process requests may be received.

If the answer to interrogatory block 178 is in the negative, the process continues to interrogatory block 186, which determines as to whether the operator desires to exit from the EV analyzer. If not, the process flow continues to block 164. If the answer is in the affirmative, the EV analyzer is closed at block 188 and the process ends as reflected at block 190. An option to print any screens or data prepared during processing with EV analyzer may be added throughout the process.

Figure 6:
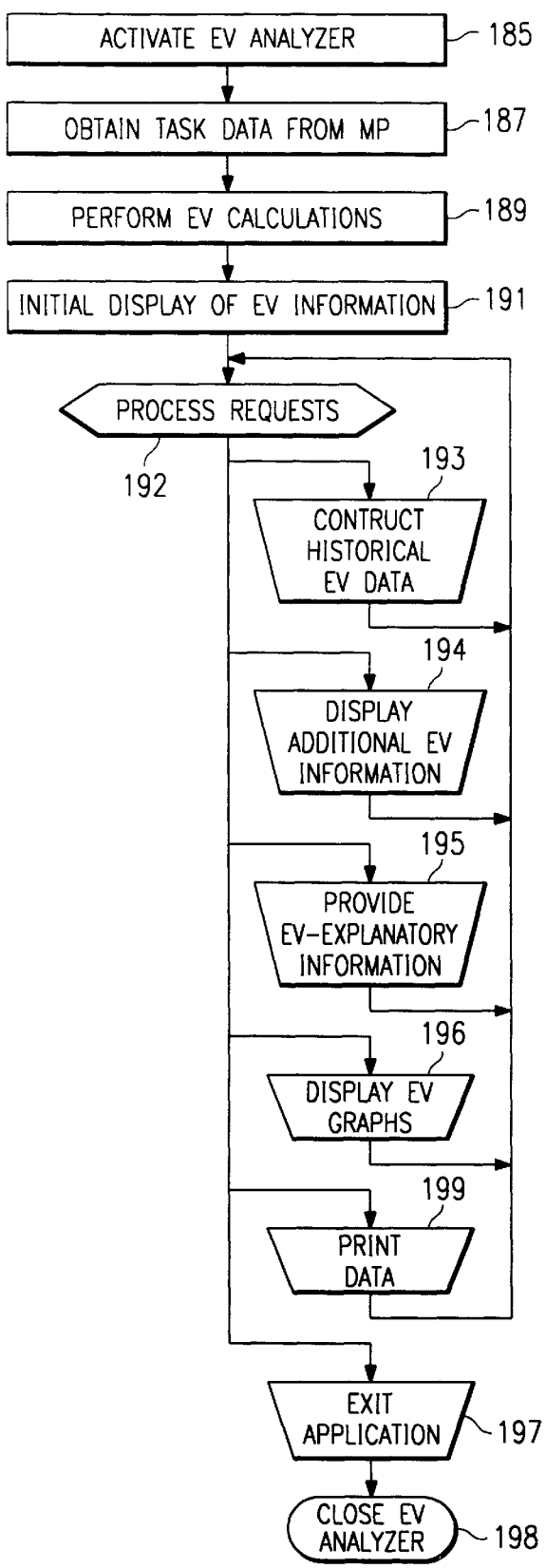
FIG. 6 is a chart illustrating one exemplary process architecture for the system of FIG. 3.

Referring now to FIG. 6, a chart illustrating one exemplary process architecture for the system of FIG. 3 is shown. FIG. 6 is analogous in most respects to the process flow of FIG. 6 but shows the structure of the process requests in a non-sequential manner. The EV analyzer is activated at block 185. The EV analyzer obtains the task data from the project management software, as reflected at block 187. Initial EV calculations are performed at block 189, and the initial presentation of EV information is made at block 191. Numerous process requests may then be entered as shown at block 192. The options illustrated include constructing historical data by decomposing it from task data as shown at block 193, displaying additional EV information or EV-related information at block 194, providing EV explanatory information at block 195, displaying EV graphs at block 196, or printing any of the EV information or EV-related information or graphs at block 199. The application may also be exited as reflected by block 198.

As suggested by block 193, an additional option for presenting historical information is to construct a report of historical data. This may be accomplished by analyzing previous EV information for previous time reporting increments. Thus, the task data may be obtained through the object link 54 (FIG. 4) and decomposed or analyzed at different increments to obtain historical EV information and EV-related information at each increment. The decomposition involves calculating for each reporting time increment, e.g., weeks, between the baseline project start date and the current date, the CPI, SPI, BCWP, BCWS, ACWP, CV % and SV %. The data points corresponding to each reporting time increment may then be used to prepare the historical EV information as well as the current EV information. The historical data alone or with the current data may then be displayed.

As discussed above, once the active schedule or task data is obtained from the project management software, through the object link, information and EV-related information may be determined and displayed as suggested by blocks 160 and 162 (FIG. 5) and blocks 189 and 191 (FIG. 6). This information may include the cost variance, cost variance percent, cost performance index, schedule variance, schedule variance percentage, schedule performance index, percent complete, percent spent, forecast at completion, to-complete-performance index (forecast), to-complete-performance index (baseline), improvement ratio (forecast), improvement ratio (baseline), variance at completion, and/or independent forecast among other possible calculations.

Additionally, a historical data file may be obtained if it exists and additional trend information developed if desired. Thus, upon opening the EV analyzer, the initial screen may display, for example, the cost variance, cost variance percent, cost performance index, schedule variance, schedule variance percent, and schedule performance index. This initial screen may also serve as a process request screen for additional information or activities. In addition to the exemplary process requests discussed above, a user may, for example, request trend analysis graphs as will be described further below.

If additional information regarding EV is desired as indicated at blocks 166 and 194, the information is prepared for display. The desired information may have already been calculated above at block 160, but if not the calculations may be made and then displayed. Such request may involve merely clicking a button on an initial screen instructing the EV analyzer to present additional EV-related information. For example, if only EV information and two EV-related numbers are initially presented (i.e., a default setting), the operator may request other EV-related information.

If an operator desires additional information explaining the EV information or EV-related information, an operator may click on a button associated with different display fields. When this is done, the information is evaluated to provide conditional narrative information based on the current EV information or EV-related information as calculated. The conditional aspect provides information or instructions appropriate for the current EV-related information, such as information indicating that performance is poor and corrective action should be considered or that performance is good and the like. The narrative and information is then displayed incorporating the specific current EV information or EV-related information. For example, if an operator desires to learn more about the percent of project complete information the operator may click on that number on the screen at which time the number is analyzed by the EV analyzer to determine the exact response. The response may be something such as:

percent complete indicates what percentage of the project is complete based on the ratio of earned value (also known as BCWP-Budget Cost of Work Performed) to the total project baseline. At this point in your project, you have delivered [the specific amount would be inserted here] of earned value in relationship to the [insert specific amount here] of the total project earned value which was baselined for delivery.

A conditional information statement may be added based on how the information reflects performance; for example, it may say something like that shown below:

A word of caution! You may want to take a look at your project from a cost performance perspective, we can see that although you have delivered 33% [number here is just for example] of the project from an earned value perspective, you've expended 38.4% [number is just for example] of your baseline budget for this project.

As another example, the operator may click on the percent spent field requesting additional information and receive a response something like:

Percent spent indicates what percentage of the project budget has been spent based on the ratio of actual cumulative total expenditures to the project's current total expenditure forecast. At this point in your project, you have spent 38.46% [number is just for example] of your total forecasted budget of $15,600 [numbers just for example purposes]. A word of caution! You may want to take a look at your project from a cost performance perspective. We can see that you have spent 38.46% of your project budget, but you only delivered 33.3% of your total earned value baseline.

These are but two examples, other fields would have like definitions and explanatory information and may or may not have conditional or cautionary statements. The EV analyzer may compare the EV information and EV-related information against tables in determining whether a conditional statement should be added and what information it should contain. For example, if a given number is greater than a specified magnitude or greater than a specified percentage, it may be indicative of some type of problem, suggesting that a cautionary statement may be added to the explanation.

As another aspect of providing conditional statements, a coloring scheme may be used to help convey the general impact of the numbers calculated. If a negative variance is calculated and is to be displayed, it may be presented in a specific color to designate it is a negative and to call attention to it; for example, it may be displayed in red if its negative, and green may be used if it is positive. While it is normal for every project to have some variation between baseline, actual, and earned value, variances that are significant need to at least be resolved and carefully considered. A variance may be considered significant when it exceeds both a specified value or magnitude and a percent threshold. Different thresholds may be established for current month, cumulative, and at-completion variances. For example, higher current-month thresholds may be established to compensate for the inherent monthly positive and negative swings that may occur. The permissible at-completion variance may be smaller because it forecasts an overall impact on the project.

If additional EV information is requested at blocks 178 and 196 a number of different types of additional information may be prepared. By accessing historical data file or decomposing task data as will be described further below, graphs and other trend information showing the performance of the project with a historical perspective may be presented. In a preferred embodiment, the information is presented in the form of several different types of graphs and may be in the form of several different types of graphs. Each of the different types of graphs is preferably calculated in advance (i.e., before it is requested) such that the operator is only toggling between different screens that have already been prepared with the different presentations of the appropriate information. For example, on one screen, the cost and schedule variance percentages for EVA may be presented with percent on the ordinate and time on the abscissa. On another screen or window, the cumulative EVA may be presented with money or effort hours on the ordinate and time on the abscissa axis. On a further screen or window, cost performance index to schedule performance index ratio graph may be presented with the ratio on the ordinate and time on the abscissa axis. The prominent graph of the baseline, actuals, and cumulative EV for the project may be presented in a form like that shown in FIG. 2.

For each graph presented, the operator may request additional information concerning the graph by selecting a button, selecting an item from a menu, clicking on a location on a graph, or other similar input. Such a selection would bring up a graph explanation display. For example, if an operator is doing the cost and schedule variance percentages graph and requests additional information about the graph, an explanation such as the following may be raised:

The variance percentages graph show the trend for two earned value indicators, cost variance percent and schedule variance percent. Cost variance percentage shows how far the cost performance of the project is from the baseline. In a sense, it is like asking was the work we accomplished this reporting period delivered at cost discount or cost premium? The ability to see the cost percentage trend over the life of the project should provide some feeling about the consistency with which actual expenditures are tracking to the baseline. The schedule variance percentage provides an indication regarding the consistency at which schedule activities are being completed with respect to the baseline. In effect, it is like asking the question, for this reporting period, how close to the baseline were we in completing our activities on time?

The screening can also give more specific information about the indications of positive and negative variances. For example, if the operator desires more information on the schedule performance to cost performance indices graph, the following information may be raised as a narrative:

The SPI/CPI graph shows the cumulative track of performance indices for cost/schedule and the RN value index. If the project is on schedule and within budget, both indicators should track at 1.0. The CPI tells us for each dollar we spend, how much earned value are we receiving in return. The SPI tells us for every dollar we have spent to date, how much schedule progress are we receiving in terms of earned value.

Appropriate narratives may be added as desired for each graph.

Figure 7:
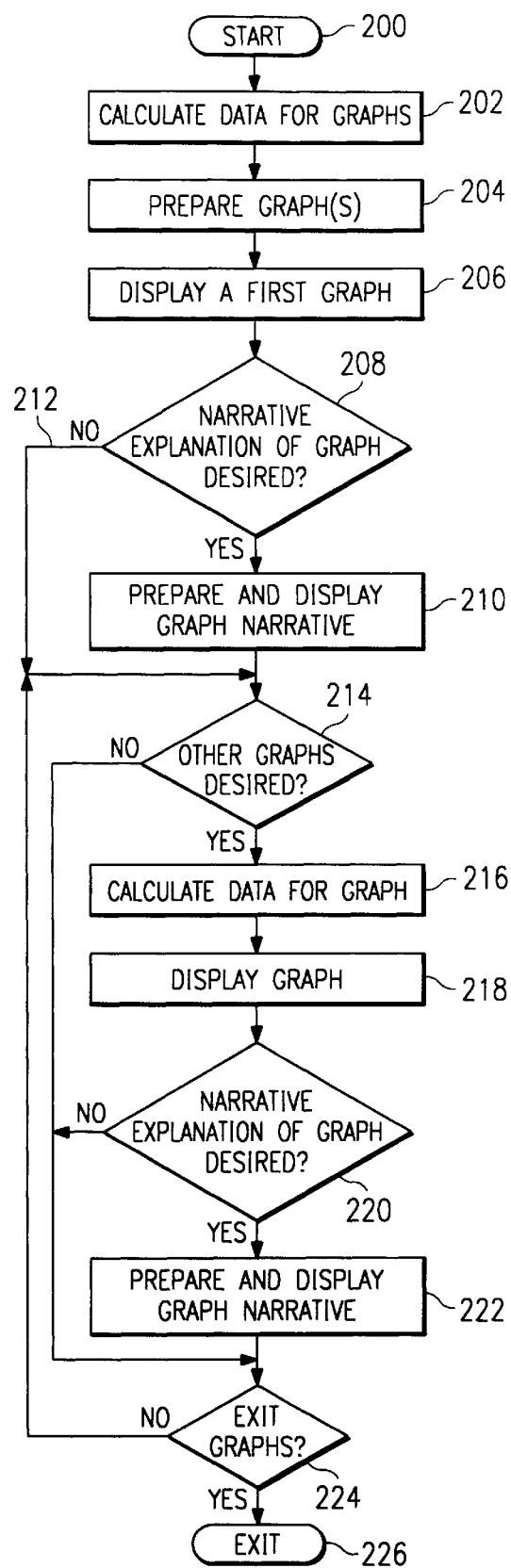
FIG. 7 is a flowchart illustrating one exemplary process for presenting EV information according to the present invention.

FIG. 7 is a flowchart illustrating one exemplary process for presenting EV information according to the present invention. When the process is started such as at block 184 of FIG. 6, and as shown in FIG. 7 at block 200, any additional calculations necessary for the preparation of the graphs which had not previously been performed are calculated at block 202. The underlying data is formatted and prepared for display at block 204. While a number of graphs may be prepared for display in blocks 202 and 204, one such graph is selected as a default and displayed at block 206.

If interrogatory block 208 is answered in the negative, the process proceeds directly to block 214; otherwise, the narrative explanation of the graph is prepared and displayed at block 210 before continuing to interrogatory block 214. At interrogatory block 214, an operator may select from the various graphs available. If the operator desires another of the specific graphs, the answer to interrogatory block 214 will be in the affirmative and the process continues to block 216 and block 218 where any additional data is calculated and then displayed. As noted above, the data required for display may have already been calculated. The operator may then indicate a desire for a narrative explanation of the graph as shown by interrogatory block 220. If such an explanation is desired, the process prepares and displays such information at block 222 and then continues to interrogatory block 224.

If the answer to interrogatory block 220 or 214 is in the negative, the process directly proceeds to block 224. At interrogatory block 224, the operator is given the opportunity to exit the graph portion of the EV analyzer. If the answer to interrogatory block 224 is in the affirmative the process for presenting EV information ends at block 226 and the process flow may continue to block 164 along path 176 (FIG. 5) as described earlier. Before exiting, the operator may be asked whether the current EV information should be stored in the historical EV data file. If the answer to interrogatory block 224 is in the negative, the process flow preferably returns to interrogatory block 214 to allow the operator to request additional graphs.

Although the present invention and its advantages have been described in detail, it should be understood that various changes, substitutions, and alterations can be made therein without departing from the spirit and scope of the invention as defined by the appended claims.

What is claimed is:

1. A system for monitoring and assessing the performance of a project, comprising:
    a computer; and
    a software program executed by the computer, the software program and computer being operable in combination to:
        receive project task data,
        determine earned value information from the project task data,
        display the earned value information,
        prepare explanatory information about the earned value information, the explanatory information including conditional information prepared with a content dependent on the earned value information, and
        display the explanatory information.

2. The system of claim 1 wherein the earned value information includes earned value related information.

3. The system of claim 1 wherein the computer is operable to receive operator requests from an operator, and wherein the preparation and display of the explanatory information is carried out in response to an operator request therefor.

4. The system of claim 1, wherein the software program and computer are further operable to prepare the conditional information so that the content thereof provides a comparison of earned value information to other information.

5. The System of claim 4, wherein the other information includes budget information.

6. The system of claim 1, wherein the software program and computer are operable to prepare the explanatory information to include predetermined nonconditional information in addition to the conditional information.

7. The system of claim 1, wherein the conditional information includes a cautionary statement.

8. The system of claim 1, wherein the software program and computer are operable to prepare the conditional information by selecting one of two colors in dependence on the earned value information, and are operable to effect the display of the conditional information by displaying at least a portion thereof in the selected color.

9. The system of claim 8, wherein the software program and computer are operable to effect the selection of a color by determining whether a value from the earned valued information is outside a predetermined limit.

10. The system of claim 8, wherein the software program and computer are operable to effect the selection of a color by determining whether a value from the earned value information is outside each of two different predetermined limits.

11. A method for monitoring and assessing the performance of a project, comprising the steps of:
    obtaining project task data;
    calculating earned value information from the project task data;
    displaying the earned value information,
    preparing explanatory information about the earned value information, including the step of preparing conditional information which is included in the explanatory information and which has a content dependent on the earned value information, and
    displaying the explanatory information.

12. The method of claim 11 wherein the earned value information includes earned value related information.

13. The method of claim 11, wherein said step of preparing the conditional information includes the step of preparing the conditional information so that the content thereof provides a comparison of earned value information to other information.

14. The method of claim 13, wherein said step of preparing the conditional information includes the step of including budget information in the other information.

15. The method of claim 13, wherein said step of preparing the conditional information includes the step of obtaining the other information from a table.

16. The method of claim 11, wherein said step of preparing the explanatory information includes the step of including predetermined nonconditional information in the explanatory information in addition to the conditional information.

17. The method of claim 11, wherein said step of preparing the conditional information includes the step of including a cautionary statement therein.

18. The method of claim 11, wherein said step of preparing the conditional information includes the step of selecting one of two different colors in dependence on the earned value information, and wherein said step of displaying the conditional information includes the step of displaying at least a portion thereof in the selected color.

19. The method of claim 18, wherein said step of selecting a color includes the step of determining whether a value from the earned value information is outside a predetermined limit.

20. The method of claim 18, wherein said step of selecting a color includes the step of determining whether a value from the earned value information is outside each of two different predetermined limits.

* * * * *